US009843400B2

(12) United States Patent
Sinha et al.

(10) Patent No.: US 9,843,400 B2
(45) Date of Patent: Dec. 12, 2017

(54) BROADBAND UNIDIRECTIONAL ULTRASOUND PROPAGATION

(71) Applicant: Los Alamos National Security, LLC, Los Alamos, NM (US)

(72) Inventors: Dipen N. Sinha, Los Alamos, NM (US); Cristian Pantea, Los Alamos, NM (US)

(73) Assignee: U.S. Department of Energy, Washington, DC (US)

( * ) Notice: Subject to any disclaimer, the term of this patent is extended or adjusted under 35 U.S.C. 154(b) by 202 days.

(21) Appl. No.: 14/680,031

(22) Filed: Apr. 6, 2015

(65) Prior Publication Data
US 2016/0013871 A1    Jan. 14, 2016

Related U.S. Application Data

(60) Provisional application No. 61/975,878, filed on Apr. 6, 2014.

(51) Int. Cl.
*H04B 11/00*    (2006.01)
*G10K 11/04*    (2006.01)
(52) U.S. Cl.
CPC .............. *H04B 11/00* (2013.01); *G10K 11/04* (2013.01)
(58) Field of Classification Search
CPC .................................. G10K 11/04; H04B 11/00
See application file for complete search history.

(56) References Cited

U.S. PATENT DOCUMENTS

| 4,178,553 A | 12/1979 | Fisher et al. |
| 4,823,908 A * | 4/1989 | Tanaka ................... G10K 11/28 181/148 |
| 4,924,449 A * | 5/1990 | Guigne ................... G01H 5/00 367/104 |
| 5,296,824 A | 3/1994 | Cho et al. |
| (Continued) | | |

FOREIGN PATENT DOCUMENTS

WO    WO 2015157199 A1 * 10/2015    ............. H04B 11/00

OTHER PUBLICATIONS

International Searching Authority, International Search Report, PCT/US15/024588, dated Jul. 9, 2015, pp. 1-8.

*Primary Examiner* — Daniel Pihulic
(74) *Attorney, Agent, or Firm* — Samuel M. Freund; Cochran Freund & Young LLC

(57) ABSTRACT

A passive, linear arrangement of a sonic crystal-based apparatus and method including a 1D sonic crystal, a nonlinear medium, and an acoustic low-pass filter, for permitting unidirectional broadband ultrasound propagation as a collimated beam for underwater, air or other fluid communication, are described. The signal to be transmitted is first used to modulate a high-frequency ultrasonic carrier wave which is directed into the sonic crystal side of the apparatus. The apparatus processes the modulated signal, whereby the original low-frequency signal exits the apparatus as a collimated beam on the side of the apparatus opposite the sonic crystal. The sonic crystal provides a bandpass acoustic filter through which the modulated high-frequency ultrasonic signal passes, and the nonlinear medium demodulates the modulated signal and recovers the low-frequency sound beam. The low-pass filter removes remaining high-frequency components, and contributes to the unidirectional property of the apparatus.

13 Claims, 13 Drawing Sheets

(56) References Cited

U.S. PATENT DOCUMENTS

| | | |
|---|---|---|
| 6,408,978 B1 | 6/2002 | Premus |
| 2005/0185800 A1* | 8/2005 | Croft, III ................ H04R 3/00 381/77 |
| 2009/0310441 A1 | 12/2009 | Johnson et al. |
| 2011/0080804 A1 | 4/2011 | Vu et al. |
| 2012/0186904 A1* | 7/2012 | Cheng ................... G10K 11/04 181/175 |
| 2016/0013871 A1* | 1/2016 | Sinha .................... G10K 11/04 367/137 |

* cited by examiner

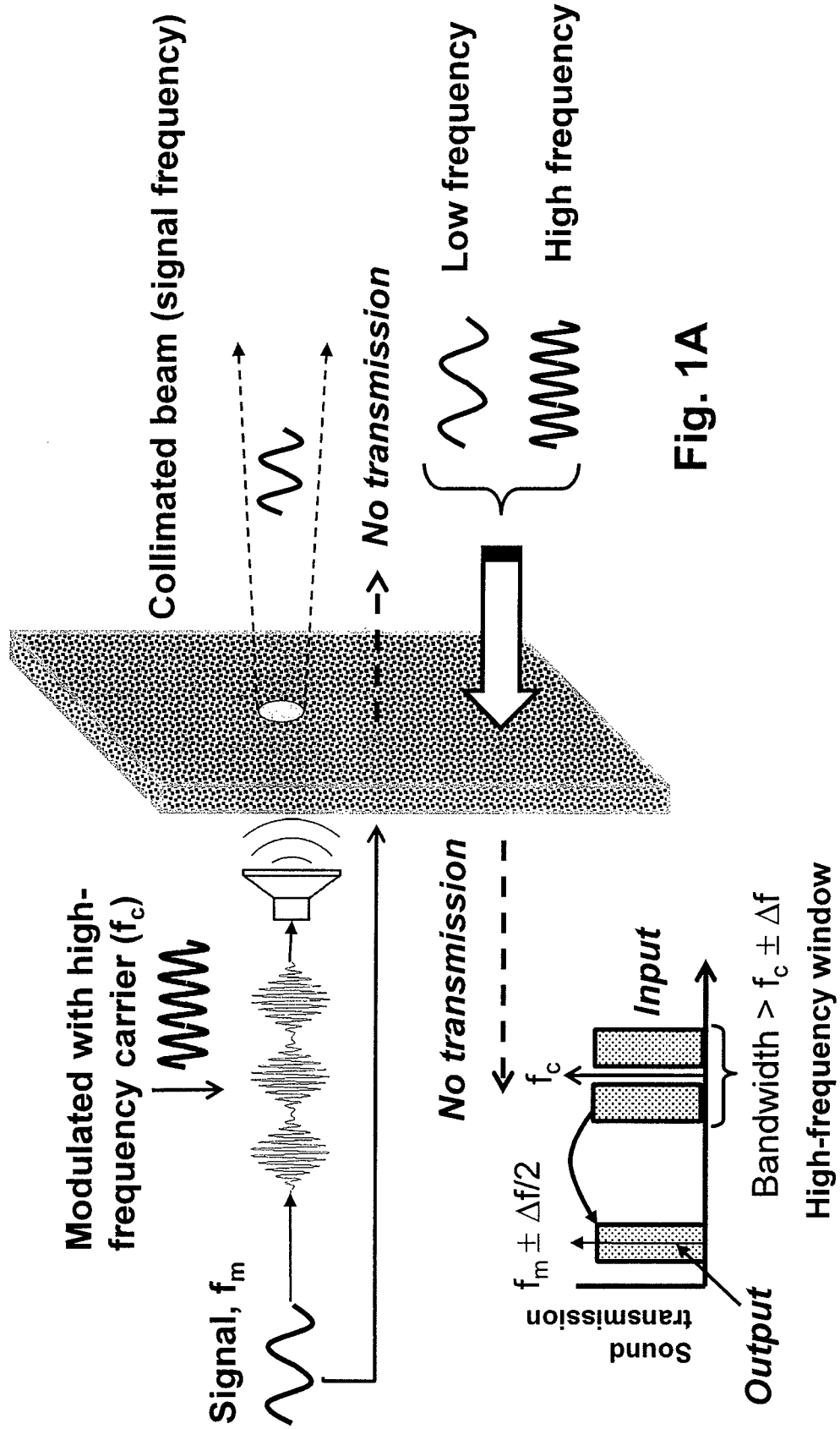

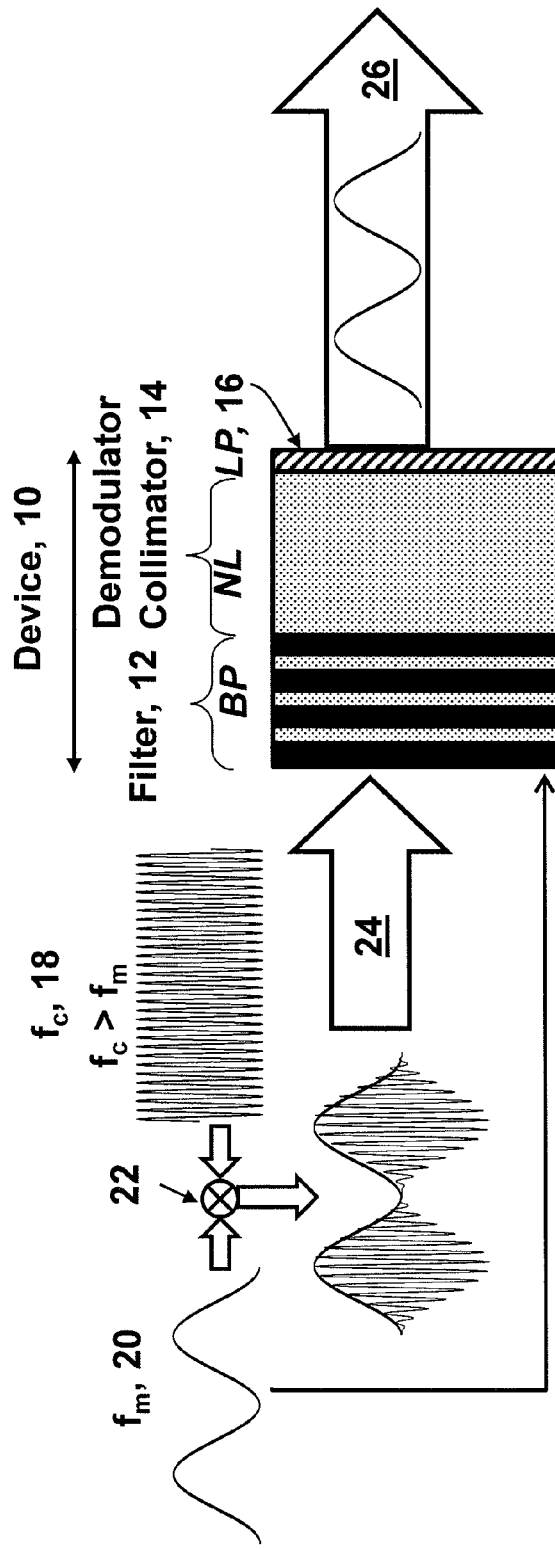
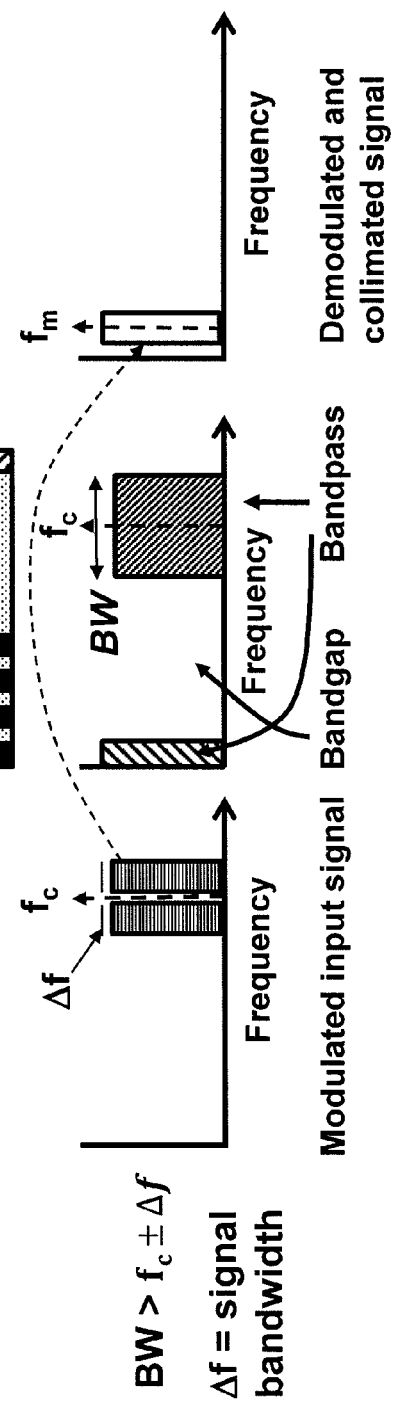
FIG. 2A
FIG. 2B
FIG. 2C
FIG. 2D

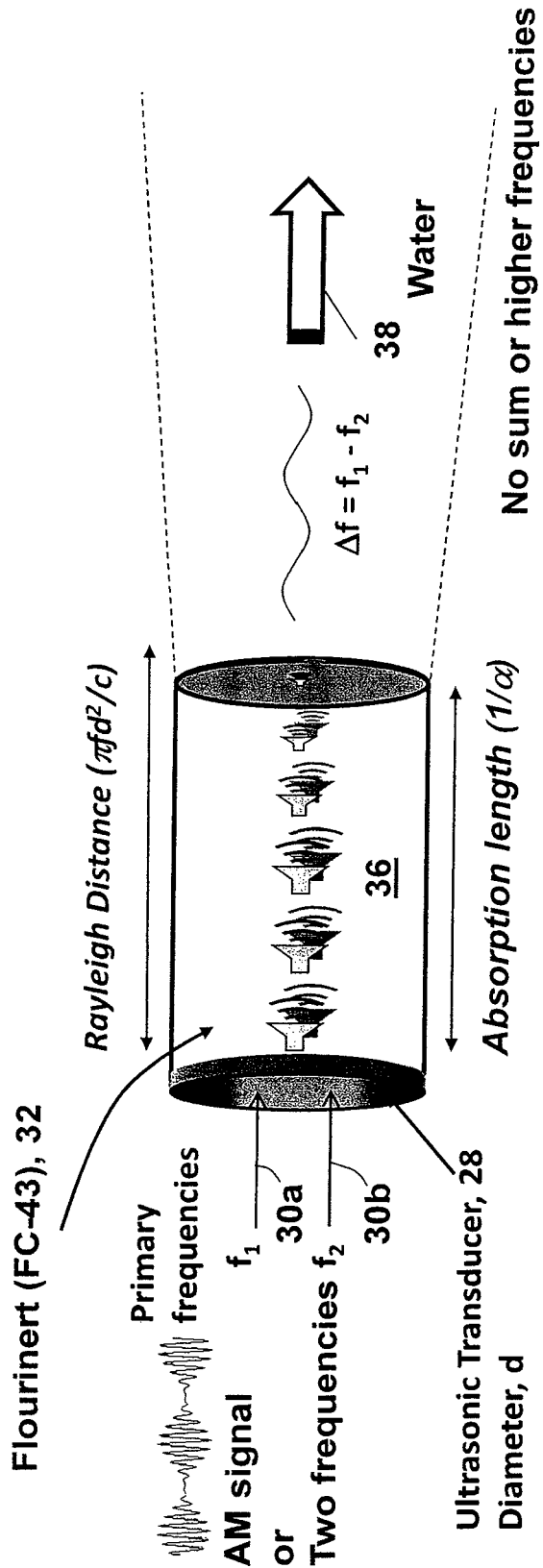
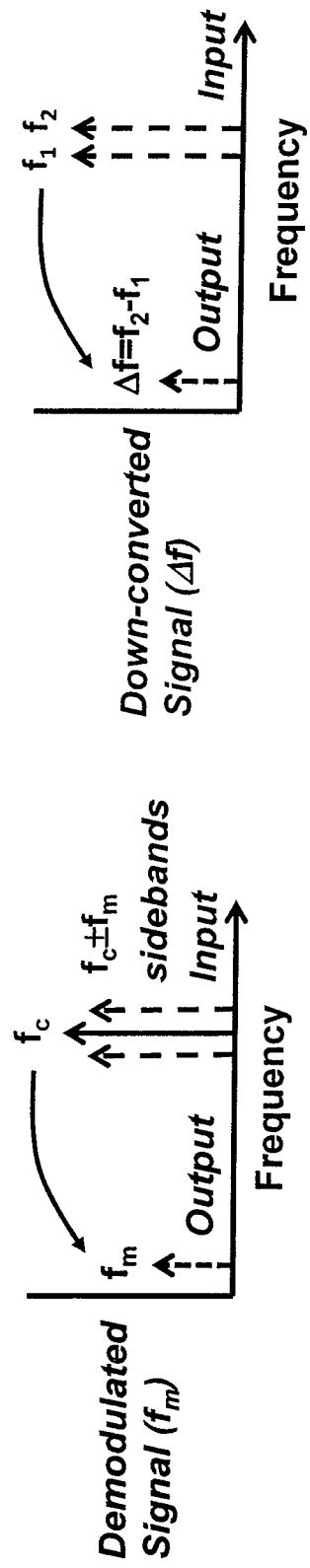
FIG. 4A
FIG. 4B
FIG. 4C

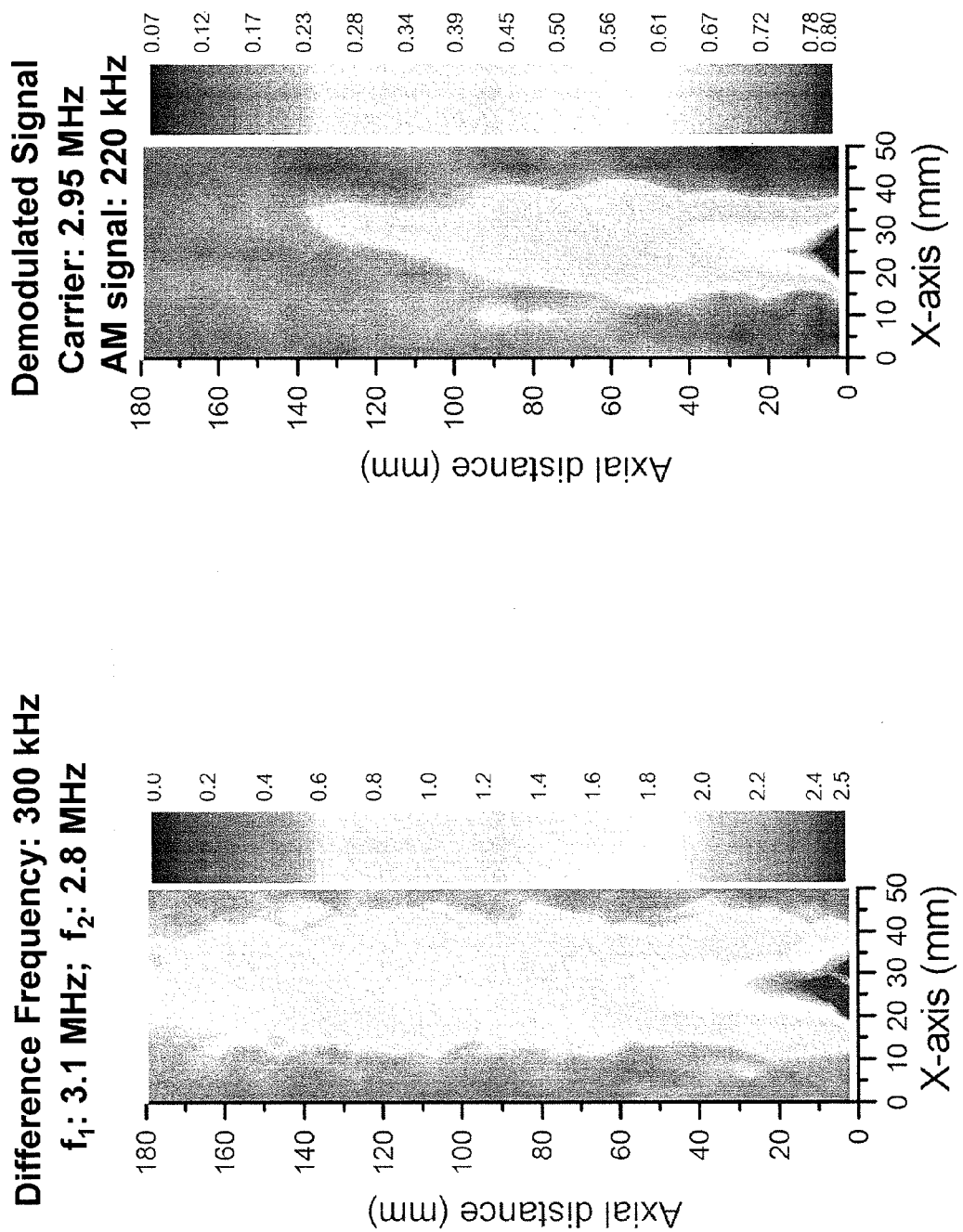

BROADBAND UNIDIRECTIONAL ULTRASOUND PROPAGATION

CROSS-REFERENCE TO RELATED APPLICATIONS

The present application claims the benefit of U.S. Provisional Patent Application No. 61/975,878 for "Broadband Unidirectional Ultrasound Propagation Using Sonic Crystal and Nonlinear Medium" which was filed on Apr. 6, 2014, the entire contents of which application is hereby specifically incorporated by reference herein for all that it discloses and teaches.

STATEMENT REGARDING FEDERAL RIGHTS

This invention was made with government support under Contract No. DE-AC52-06NA25396 awarded by the U.S. Department of Energy. The government has certain rights in the invention.

BACKGROUND

The study of sound propagation with super-directivity is important for applications ranging from medical imaging, underwater communication, ultrasonic imaging through opaque fluids, to nondestructive testing. In addition, unidirectional and broadband communication using collimated high-frequency sonar ultrasound beams (200 kHz-1 MHz) through barrier walls is necessary for tamper-proof operation of underwater sensitive devices at ocean bottom that can send information from the inside in a beam but ultrasound signals cannot penetrate the device wall in the opposite direction. Simple sound-proofing walls block sound waves from both directions and are not usable for this purpose.

The oil and gas industry makes extensive use of both unmanned underwater vehicles (UUV) and Remotely Operated Vehicles (ROV). ROVs are underwater robots that allow the controller to be located on surface but are connected via an umbilical link that houses communication cables. As more advanced sensing and monitoring devices are developed that are deployed on sea bed or under ocean, it will become increasingly important to protect such communication and make these devices secure and tamper-proof.

The feasibility of an acoustic rectifier consisting of two segments: a sonic crystal (alternating of water and glass), and a nonlinear medium produced from a microbubble suspension has been demonstrated. See, e.g., B. Liang et al. in "An acoustic rectifier," Nature Materials 2010; 9(12): 989-92. The sonic crystal was designed to behave as an acoustic filter, and sound of frequency ω enters the nonlinear medium first and produces harmonics 2ω that passes through the subsequent sonic crystal, SC, acoustic filter, but blocks the original signal. The pass bands were centered on 1.8 and 2 MHz with a width of approximately 150 kHz for each band. However, when impinging on the opposite side, the original frequency is blocked because of a band gap at that frequency. Another apparatus for acoustic rectification has been demonstrated. See, e.g., N. Boechler et al. in "Bifurcation-based acoustic switching and rectification", Nature Materials, 2011; 10(9): 665-8, where the interaction of periodicity, nonlinearity, and asymmetry in a granular crystal, are utilized, and which includes a statically compressed, one-dimensional array of particles and a light mass defect near a boundary. This apparatus was demonstrated for very low-frequency (<15 kHz) sound transmission.

A sonic crystal based on a shaped array of scatterer—steel square-prism columns has also been reported. See, e.g., X.-F. Li et al. in "Tunable Unidirectional Sound Propagation through a Sonic-Crystal-Based Acoustic Diode," Physical Review Letters, 2011; 106(8): 084301. In that apparatus, the sonic crystal achieves unidirectional flow by means of saw-tooth spatial asymmetry in the arrangement of columns. However, the sound waves exiting that apparatus are not parallel to those entering, and the transmitted sound waves are narrow band and at low frequencies (<50 KHz). Tunability can be achieved by mechanical manipulation of the rods.

SUMMARY

Embodiments of the present invention overcome the disadvantages and limitations of the prior art by providing a passive apparatus and method for generating a broadband unidirectional ultrasonic signal.

Another object of embodiments of the present invention is to provide a passive, apparatus and method for generating a broadband unidirectional ultrasonic signal for communications.

Still another object of embodiments of the present invention is to provide a passive apparatus and method for generating a broadband unidirectional ultrasonic signal for communications, wherein the output signal is collimated.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of embodiments of the present invention, as embodied and broadly described herein, the apparatus for generating a collimated acoustic signal having a single frequency $f_m$ or a band of frequencies centered at $f_m$, from an input carrier signal having a frequency $f_c > f_m$ amplitude modulated by $f_m$, hereof includes: a low-loss acoustic bandpass filter for receiving the modulated carrier signal, and having a bandwidth larger than an amplitude modulated sideband of the amplitude modulated $f_c$; and an acoustic nonlinear medium for receiving and demodulating the amplitude modulated $f_c$ from the acoustic bandpass filter, whereby a collimated acoustic signal having a frequency $f_m$ is generated.

In another aspect of embodiments of the present invention and in accordance with its objects and purposes, the method for generating a collimated acoustic signal having a frequency $f_m$ or a band of frequencies centered at $f_m$, from an input carrier signal having a frequency $f_c > f_m$ amplitude modulated by $f_m$, hereof includes: passing the modulated carrier signal through a low-loss acoustic bandpass filter having a bandwidth larger than an amplitude modulated sideband of the amplitude modulated $f_c$; and demodulating the bandpass filtered amplitude modulated $f_c$ from the acoustic bandpass filter, whereby a collimated acoustic signal having a frequency $f_m$ is generated.

In still another aspect of embodiments of the present invention and in accordance with its objects and purposes, the apparatus for generating a collimated, unidirectional acoustic signal having a frequency $f_m$ or a band of frequencies centered at $f_m$, from an input carrier signal having a frequency $f_c > f_m$ amplitude modulated by $f_m$, hereof includes: a low-loss acoustic bandpass filter for receiving the modulated carrier signal, and having a bandwidth larger than an amplitude modulated sideband of the amplitude modulated $f_c$; an acoustic nonlinear medium for receiving and demodulating the amplitude modulated $f_c$ from the acoustic bandpass filter, whereby a collimated acoustic signal having a frequency $f_m$ is generated; and a low-pass acoustic filter for preventing the carrier signal or the amplitude modulated carrier signal from being transmitted through the apparatus in the direction opposite to the generated collimated acoustic signal.

In yet another aspect of embodiments of the present invention and in accordance with its objects and purposes, the method for generating a collimated, unidirectional acoustic signal having a frequency $f_m$ or a band of frequencies centered at $f_m$, from an input carrier signal having a frequency $f_c > f_m$ amplitude modulated by $f_m$, hereof, includes: passing the modulated carrier signal through a low-loss acoustic bandpass filter having a bandwidth larger than an amplitude modulated sideband of the amplitude modulated $f_c$; demodulating the bandpass filtered amplitude modulated $f_c$ from the acoustic bandpass filter, whereby a collimated acoustic signal having a frequency $f_m$ is generated; and passing the collimated acoustic signal having a frequency $f_m$ through a low pass filter, whereby the carrier signal or the amplitude modulated carrier signal are prevented from being transmitted through the bandpass filter in the direction opposite to the generated collimated acoustic signal.

Benefits and advantages of embodiments of the present invention include, but are not limited to, providing an apparatus and method for generating broadband unidirectional ultrasound propagation, wherein (1) low-frequency, <1 MHz, sound is transmitted in only one direction, all other frequencies of sound being blocked in both directions; (2) the low frequency sound cannot be transmitted, but is modulated with a high-frequency (MHz) signal, which serves as a key without which no signal transmission occurs, specially chosen for the requirement, as in the case of underwater operation, or can be dynamically tuned; (3) electrical power may be generated inside the enclosure from the low frequency transmission using a piezoelectric converter; (4) the transmitted low-frequency appears as a collimated beam (a few degrees of divergence even at audible range, in air) available for directional communication or sound transmission, whereas low-frequency sound generated in a conventional speaker, for example, spreads out depending on its frequency, the lower the frequency, the greater the spread; (5) the low-frequency range can be selected by choosing the carrier frequency; (6) embodiments of the invention incorporate a combination of an artificially engineered material (metamaterial), such as phononic and sonic crystals, as examples, and a nonlinear medium; and (7) the components can be manufactured in large quantities and in large sizes (areas).

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 1A is a schematic representation of the principle of unidirectional low-frequency sound transmission through a passive wall as a collimated beam with high bandwidth, illustrating that the low-frequency signal to be transmitted through the wall cannot penetrate the wall in either direction, nor can any high-frequency carrier frequency alone by itself; rather, as seen in FIG. 1B, if the low-frequency signal is modulated with a carrier frequency that based on the design of the wall material, and transmitted, the wall demodulates this modulated signal a produces a beam of the original signal; the amplitude modulation can also be single-sideband modulation, where there is only one sideband instead of two thereby effectively doubling the bandwidth of the signal that can be accommodated.

FIG. 2A is a schematic representation of an embodiment of the apparatus of the present invention; FIG. 2B shows a spectrum of the modulated input signal; FIG. 2C illustrates the bandpass and bandgap of the sonic crystal; and FIG. 2D shows the demodulated collimated signal, all for one direction, there being no sound transmission in the opposite direction.

FIG. 4A illustrates the concept of signal demodulation and difference frequency generation in a nonlinear fluid, the speaker symbols in the nonlinear mixing fluid represent how each point along the axis of the ultrasonic transducer become a virtual source due to frequency mixing creating a so-called end-fire array; FIGS. 4B and 4C show the frequency spectra for the two types of signal, the amplitude modulated signal is a carrier signal with two side bands and is very similar to the two separate frequencies shown in FIG. 4C for the two-frequency operation; in the situation where single sideband modulation is employed, both situations produce two, high-frequency components and are similar.

FIG. 13A illustrates profiles of the sound beam exiting from the apparatus into water, for a difference frequency of 300 kHz, and FIG. 13B shows the beam profile measured for a demodulated signal (2.95 MHz sine-wave carrier wave amplitude modulated by a 220 kHz sine wave signal).

DETAILED DESCRIPTION

Figure 3:
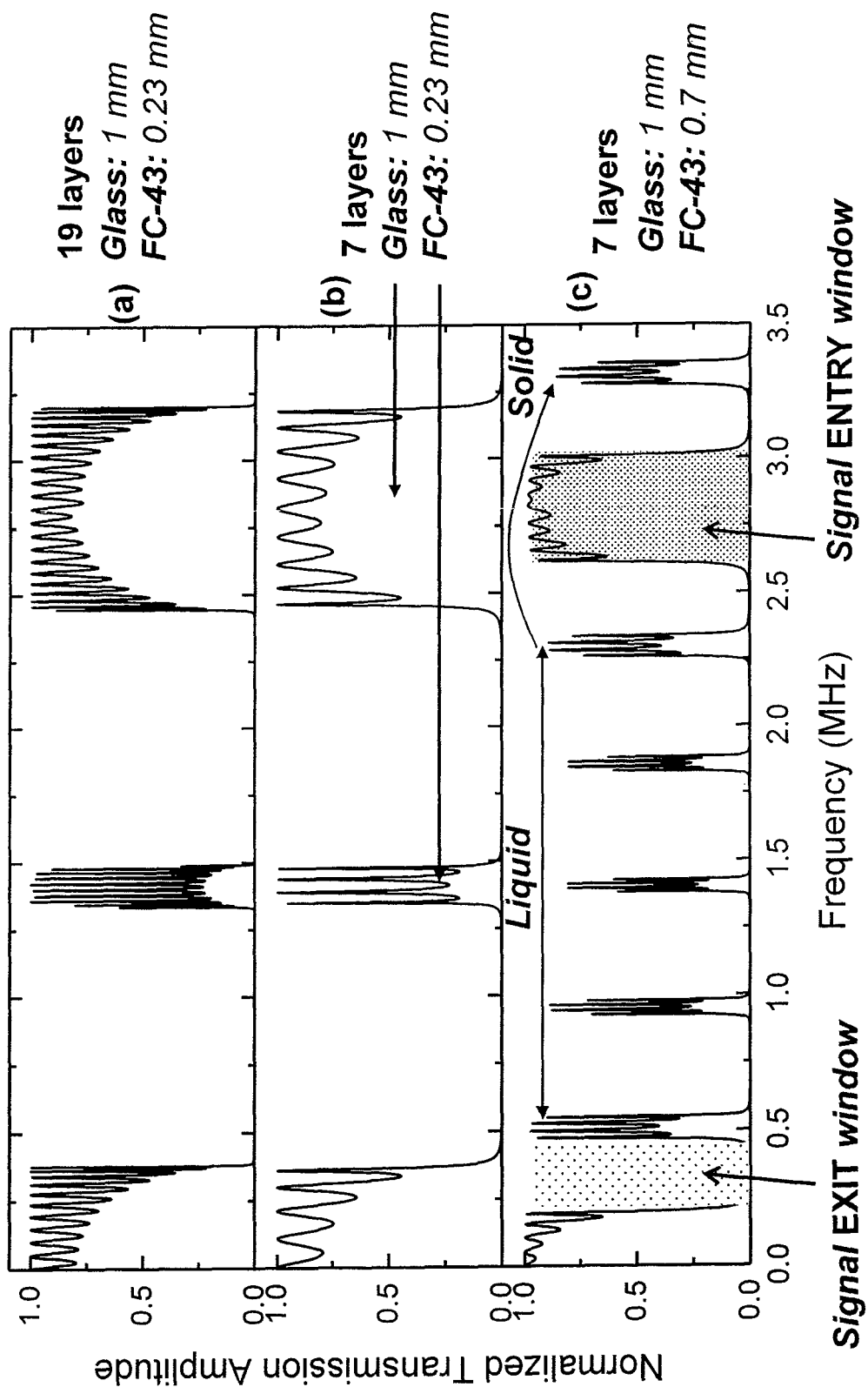
FIG. 3, graph (a) shows the theoretically predicted sound transmission through the apparatus shown in FIG. 2 hereof, including a sonic crystal composed of 7 layers of an alternate structure made from glass microscope slides (25 mm×25 mm×1 mm) and 0.7 mm thick layer of FC-43, which provides a composite of transmission bands due to the liquid layers and the solid layers with the modulated signal entry frequency window and the exit frequency windows being shown as shaded regions; graph (b) shows the effect on the liquid bands for thickness of 0.23 mm of FC-43; and graph (c) shows the improvement in the band structure that can be obtained in terms of well-defined band structure by increasing the number of layers to 19, with the input sound pressure amplitude assumed to be constant over the entire frequency range; the wider bandpass due to the glass layer is shown between 2.5 and 3.00 MHz, while the narrower transmission bands are due to the presence of the intervening liquid layers.

Briefly, embodiments of the present invention include apparatus and method for unidirectional and broadband communication using a collimated ultrasound beam demonstrated herein in the high-frequency sonar range between 200 kHz and 1 MHz, which is above the hearing range of marine mammals, but below frequencies which are significantly attenuated by water, for underwater applications, as an example. Communications may be achieved in air or water, or in any fluid, by modulating a carrier wave of the required frequency with the desired signal that passes through a barrier wall, but is automatically demodulated by the wall material to reproduce the low-frequency modulating signal that then propagates as a beam without requiring signal processing electronics. In effect, the passive barrier wall material becomes the apparatus that functions without electronics to propagate the signal. Such communication also requires the information to pass through selective high-frequency transmission windows that are different from the desired broad-band 200 KHz-1 MHz low-frequency signal. No such underwater ultrasound transmission in the form of a beam presently exists, and only low-frequency sonars <10 kHz have been demonstrated for sea-floor mapping that use sea water itself as the nonlinear medium.

It should be mentioned that the frequency range identified above for underwater use is not a limitation of embodiments of the present invention. The sole limitation is the absorption of the medium in which the beam is propagated. For example, it is possible to raise the frequency 10 MHz, but this will require thinner layers. Further, as stated above, air transmission is readily achieved without changing the apparatus.

The requirements for an underwater transmitting apparatus may include the following:

A high frequency ultrasonic band-pass filter with sufficient bandwidth (~1 MHz).

Automatic passive demodulation of a high-frequency amplitude-modulated (AM) carrier wave to produce the low-frequency (200 kHz-1 MHz) signal Continued propagation of the demodulated ultrasound beam in water to a distance of 50 cm (demonstrated) or much greater without any high frequency carrier signal remaining.

Sonic crystals may be constructed in the ultrasonic frequency range. These crystals permit custom-designed acoustic filters and sound transmission characteristics that include wide pass bands (≥2 MHz), that depend on the number of layers used and on the thickness of the layers. It is shown that sound having selected frequencies within a desired frequency band may pass through an apparatus. An acoustic nonlinear medium provides the capability of frequency mixing and thus can passively down-convert a high-frequency sound wave to a lower frequency wave without using electronics, and can also demodulate an amplitude-modulated signal (double-sideband or single-sideband modulation). If a suitable path-length of the medium is used for sound frequency mixing or demodulation, then the medium behaves as an end-fire antenna array (parametric array) that collimates the sound beam as it propagates. See, e.g., P. J. Westervelt in "Parametric Acoustic Array," Journal of the Acoustical Society of America. 1963; 35(4): 535-7. The acoustic nonlinearity and sound speed of the medium determine this length with higher nonlinearity and smaller sound speed shortening the effective length. A combination of the two devices (sonic crystal followed by a nonlinear medium) thus provides a manner in which an appropriate carrier frequency for carrying information through an acoustic window and then extracting that information automatically as a directional beam, may be selected. The addition of a simple low-pass acoustic filter layer after the nonlinear medium converts the present apparatus into a unidirectional device for all practical purposes. Additional information may be found in "Broadband Unidirectional Ultrasound Propagation Using Sonic Crystal And Nonlinear Medium" by Dipen N. Sinha and Cristian Pantea, Emerging Materials Research, 2, pages 117-126 (2013), which is hereby incorporated by reference herein for all that it discloses and teaches.

Reference will now be made in detail to the present embodiments of the invention, examples of which are illustrated in the accompanying drawings. In the FIGURES, similar structure will be identified using identical reference characters. It will be understood that the FIGURES are presented for the purpose of describing particular embodiments of the invention and are not intended to limit the invention thereto. Turning now to FIG. 1A, shown is a schematic representation of the principle of unidirectional low-frequency sound transmission through a passive wall as a collimated beam with high bandwidth underwater, illustrating that the low-frequency signal to be transmitted through the wall cannot penetrate the wall in either direction, nor can any high-frequency carrier frequency alone; rather, as seen in FIG. 1B, if the low-frequency signal is modulated with a carrier frequency that is based on the design of the wall material, and transmitted, the wall demodulates this modulated signal a produces a beam of the original signal. Although FIG. 1A shows only double-sideband modulation, single-sideband modulation or carrier-suppressed double-sideband modulation can also be employed. A single-sideband amplitude modulation increases the bandwidth of the signal that can be accommodated, almost by a factor of two.

An apparatus for providing these requirements is schematically illustrated in FIG. 2A, which is a schematic representation of an embodiment of apparatus, 10, of the present invention. FIG. 2B shows a spectrum of the modulated input signal (normal double-sideband amplitude modulation); FIG. 2C illustrates the bandpass and bandgap of the sonic crystal; and FIG. 2D shows the demodulated collimated signal, all for one direction of propagation, there being no sound transmission in the opposite direction. The width of the sidebands represents the input signal bandwidth that allows for sophisticated coded signal transmission.

Returning to FIG. 2A, apparatus 10 includes a linear combination of low-loss acoustic bandpass filter (BP), 12, acoustic nonlinear medium (NL), 14, and a material that behaves as a low pass acoustic filter (LP), 16. Carrier wave, $f_c$, 18, is modulated with signal $f_m$, 20, in mixer, 22, and the resulting frequency spectrum is input to apparatus 10 as signal, 24, shown in FIG. 2B as carrier frequency $f_c$ having two side-bands. It should be noted that signal $f_m$ need not be a single frequency, but may have a chosen bandwidth, and that $f_c$ is greater than $2f_m$. BP 12 is designed such that the carrier frequency falls in the middle of its pass band (see FIG. 2C). As the signal emerges from BP 12, it enters acoustic nonlinear medium 14 in which, due to mixing of the carrier frequency with the side band frequencies, the carrier wave is demodulated. The nonlinear medium removes most of the original carrier wave, and any higher frequency signals that are generated due to frequency mixing (such as the sum signal and the higher harmonics of the carrier). Higher frequencies are absorbed by the nonlinear medium as sound absorption increases with frequency as the frequency-squared. Therefore, the liquid itself behaves as a low-pass filter to a large extent. However, due to the finite pathlength chosen for the nonlinear medium in order to keep the device dimensions reasonable small, this filtering is not perfect. Therefore, any remaining demodulated carrier wave passes through low-pass acoustic filter material 16 leaving only the low-frequency signal shown in FIG. 2D as output signal, 26. Low-pass filter 16 is selected to have a larger bandwidth than that of the AM side band, and it completely stops the primary frequencies (for example, the carrier signal or the two separate high frequencies used). Any sum frequency or higher harmonics are thus filtered out. Because of the frequency mixing, the demodulated signal emerges as highly directional sound beam 26. Any high-frequency sound coming from the right hand side gets blocked by the low pass filter. High-frequency filter BP 12 also blocks any low-frequency signal, making device 10 unidirectional as required. It is assumed that there are no transmission bands below BP in the apparatus by designing the sonic crystal accordingly. However, in a simple sonic crystal, there is some transmission near zero frequency (FIG. 2C), which can be eliminated using a high-pass filter prior to the sonic crystal. This transmission which extends from zero to about 20 kHz in theory, if not blocked, permits a small amount of low-frequency signal to pass through BP in the reverse direction, as may be observed in FIG. 12 hereof, and can be used to transmit a very low-frequency signal if a source thereof is provided to the apparatus.

Acoustic bandpass filter 12 can be constructed using a sonic crystal (SC), which is an engineered periodic elastic binary structure made of two materials with different mechanical properties designed to control the propagation of mechanical waves. This is a subclass of phononic crystals where one medium is a fluid and only compressional waves can propagate through it. The basic property of such crystals is that acoustic waves within specific frequency ranges cannot propagate within the periodic structure. This range of forbidden frequencies is called the phononic band gap. There can also be strong transmission bands where sound can propagate with little attenuation. Sonic crystals have been used to generate acoustic devices that can efficiently trap, guide, and manipulate sound. See, e.g., M.-H. Lu et al. in "Phononic crystals and acoustic metamaterials," Materials Today. 2009; 12(12): 34-42. One such sonic crystal is the 1D superlattice arrangement that includes alternating layers of a solid material with a liquid in between. The feasibility of an acoustic rectifier having a different principle of operation and consisting of two segments, a sonic crystal (alternating of water and glass) and a nonlinear medium produced from a microbubble suspension has been demonstrated (See, e.g., B. Liang et al., supra. In that apparatus, sound enters from a nonlinear medium that is used to generate the second harmonic of the primary, rather than the difference frequency, as for embodiments of the present invention. The sonic crystal following the nonlinear medium was designed to behave as an acoustic filter. Sound having frequency ω enters the nonlinear medium first and produces harmonics 2ω that passes through the subsequent SC acoustic filter, but blocks the original signal. The pass bands were centered on 1.8 and 2 MHz with a width of approximately 150 kHz for each band. However, when incident from the opposite side, the original frequency is blocked because of a band gap at that frequency. The apparatus of Liang et al. is not unidirectional for the original signal, and the sound is not in the form of a beam. A SC based on a shaped array of scatterers—steel square-prism columns has also been reported. See, e.g., X.-F. Li et al., supra. In that apparatus, the sonic crystal achieves unidirectional flow by means of saw-tooth spatial asymmetry in the arrangement of columns. However, the sound waves exiting that apparatus are not parallel to those entering. The transmitted sound waves are narrow band and at low frequencies (<50 KHz). Tunability can be achieved by mechanical manipulation of the rods. A different acoustic rectifier has been demonstrated by using the interplay of periodicity, nonlinearity, and asymmetry in a granular crystal, which includes a statically compressed one-dimensional array of particles and a light mass defect near a boundary. This apparatus was demonstrated for very low-frequency (<15 kHz) sound transmission, and it is not suitable for the application proposed in embodiments of the present invention. A thermal diode using phonon rectification has been demonstrated for unidirectional heat flow but this cannot be used to send information through water as an ultrasound beam.

Sound beam collimation is the next factor for the apparatus of the present invention. Wave beams diverge when they propagate in homogeneous materials due to diffraction. However, the disappearance of diffraction, the self-collimation of wave beams, was first predicted in the field of optics for electromagnetic waves propagating through optically periodic materials, known as photonic crystals. Such sub-diffractive propagation of sound beams was also predicted for phononic or sonic crystals and recently demonstrated in 2D sonic crystals. See, e.g., I. Perez-Arjona et al. in "Theoretical prediction of the nondiffractive propagation of sonic waves through periodic acoustic media," Physical Review B. 2007; 75(1): 014304. This self-collimation study was then extended to 3D sonic crystals. The 3D sonic crystal was formed by two crossed steel cylinder structures in a woodpile-like geometry disposed in water. This type of self-collimation, strictly speaking, occurs for a single frequency within the propagation band. The frequency range of "imperfect" self-collimation extends only to a tenth of a percent of the self-collimation frequency and, therefore, this effect cannot be used for embodiments of the present invention.

Embodiments of the present invention combine a sonic crystal and an acoustically nonlinear fluid that is not highly attenuating. The SC serves as a bandpass filter with a bandwidth of ~1 MHz operating at a high frequency (>2 MHz). The location of this high-frequency transmission band is determined by the width and the sound speed of the solid layer in the SC. The bandwidth is sufficiently broad (~1 MHz) to permit an AM signal to pass through the nonlinear fluid without appreciable attenuation, where due to nonlinear frequency mixing during propagation, the signal gets demodulated and forms a collimated beam.

1. Sonic Crystal:

Sonic crystals are finite size composite materials consisting of periodic arrangements of sonic scatterers embedded in a homogeneous host material. The wavelength of sound in the host medium is comparable to the lattice spacing of the scatterers. The simplest SC is a one-dimensional binary periodic structure made of alternating homogeneous layers of a solid and a liquid with different acoustic impedances. As stated above, sonic crystals are a subset of phononic crystals, which are constructed from alternating homogeneous layers of solid materials with different acoustic impedances. As acoustic waves propagate through a sonic crystal along the direction of periodic acoustic impedance variation, the incident and scattered waves from each solid-liquid interface may interfere constructively or destructively, depending on the frequency of the acoustic wave used and the thickness of the solid and the liquid layers. Such interferences produce the well-known band structures. The sonic crystal used in accordance with the teachings of embodiments of the present invention was a periodic array of alternate layers of microscope glass slides and a liquid (Fluorinert) with acoustic impedances of 1.2 MRayl and 12.6 MRayl, respectively.

The transmission of plane elastic waves through a periodic array of parallel solid plates immersed in liquid has been studied. Such a structure is an acoustic filter with pass and attenuation bands characterized by a transmission function cos W which for normal incidence has the form:

$$\cos W = \cos 2k_1 l_1 \cdot \cos 2k_2 l_2 - \frac{1}{2}(Z_1/Z_2 + Z_2/Z_1)\sin 2k_1 l_1 \cdot \sin 2k_2 l_2. \quad (1)$$

Here $2l_1$=width of solid layer, $2l_2$=width of liquid layer, $k_1 = 2\pi f/c_1$, $k_2 = 2\pi f/c_1$, with $c_1$ and $c_2$ the compressional wave velocities in the two media, respectively, f the frequency, and $Z = \rho c$ the acoustic impedance. The pass bands correspond to the frequency regions for which $|\cos W| \le 1$, whereas the attenuation bands are characterized by $|\cos W| > 1$. From the above equation it can be observed that the pass bands occur in the neighborhood of the frequencies for which $\sin 2kl_1 = 0$ and $\sin 2kl_2 = 0$, which correspond to the characteristic resonance frequencies of each layer in the structure. The bandwidths depend on the factor $\frac{1}{2}(Z_1/Z_2 + Z_2/Z_1)$. The greater the impedance mismatch between the solid and the liquid, narrower are the pass bands and wider the intervening band gaps. The resulting transmission spectrum therefore can be viewed as a composite of two sets of resonance patterns similar to coupled oscillators. The desired attribute of the device is to have a wide pass band at high frequency and a wide band gap at frequencies below that. However, there is always a transmission band beginning with zero frequency in such a periodic structure. A transmission matrix method can be used to derive the full transmission spectrum of the phononic crystal. For sonic crystal design purposes, a simpler form for sound transmission can be used that relates the transmission amplitude to the acoustic impedance mismatch ($Z=Z_1/Z_2$) for a solid layer immersed in a fluid and is given by $$T = \frac{1}{\sqrt{1 + \left[\frac{Z^2 - 1}{2Z}\right]\sin^2\left(\frac{\omega l_1}{c_2}\right)}}. \quad (2)$$

Equation 2 shows how the maximum and the minimum sound transmission depend on the acoustic impedance mismatch. The sound attenuation is not included in the equation. The predicted sound transmission based on the 1D transmission-matrix method is shown in FIG. 3 for the device (SC formed by microscope glass slides and Fluorinert liquid, as will be described below) used in accordance with the teachings of embodiments of the present invention. The broader bandpass region due to the solid layer is between 2.5 and 3 MHz. The sound transmission pattern is determined by the SC, and is only slightly affected by the presence of the NL (FC 43) medium (see FIG. 2) due to setting up of equally spaced resonance peaks ($\Delta F$) in the liquid cavity as a function of frequency ($\Delta F = c2/2l_2$). The high frequencies passing through the bandpass region mix in the NL region.

2. Nonlinear Mixing and Beam Formation:

FIG. 4A is a schematic representation of difference frequency generation in a nonlinear fluid. Piezoelectric disc, 28, is excited by two electrical signals having different frequencies, 30a, and 30b. These generate sound at these two different frequencies in the acoustic nonlinear fluid medium, FC-43, 32. When two collinear sound beams of frequency $f_1$ and $f_2$ propagate through a nonlinear acoustic medium, the two frequencies continually mix and produce virtual sources of additional frequencies, such as a difference frequency $\Delta f$ ($\Delta f = f_1 - f_2$), a sum frequency $f_1 + f_2$, and harmonics of the primary frequencies $2f_1$, $2f_2$, etc. Speaker symbols, 34, represent examples of such virtual sources that reradiate the newly generated frequencies constituting an end-fire array, 36, which behaves as an antenna that radiates along its axis and the length of the this end-fire array antenna determines the directionality and beam spread of output signal, 38. This is the basis for a parametric array that provides high directivity of the difference frequency. The directivity of such a parametric array arises due to the use of the medium to "construct" a long virtual end-fire source along the direction of beam propagation. In a typical nonlinear fluid, the higher sum frequency and the harmonics get progressively absorbed and only the difference frequency $\Delta f$ wave continues as a collimated beam. For most liquids, the sound absorption increases as the square of the frequency and, therefore, the difference frequency passes through while the higher frequencies attenuate strongly. For encoding a signal, a simple approach is an amplitude modulated (AM) signal, which is equivalent to a carrier signal $f_c$ with two side bands ($f_c \pm \Delta f$) as shown in FIG. 4B. Therefore, during propagation through a nonlinear medium, the AM signal will get demodulated (self-demodulation), as shown in FIG. 4C. It should be pointed out that this demodulated signal does not produce the original modulating signal, but the signal becomes proportional to the second time-derivative of the envelope squared. This is not a problem for sine wave signals, but introduces distortions in more complex time-varying signal. A common practice is to predistort the original signal before modulating. A straightforward solution is to simply double-integrate and then take the square root before modulating with the carrier, such that the output automatically gets corrected after passing through the nonlinear medium.

2.1 KZK Formalism:

The KZK equation, named after Khokhlov, Zabolotskaya and Kuznetsov, was originally derived as a tool for the description of nonlinear acoustic beams. This equation accounts for the combined effects of diffraction, absorption and nonlinearity in directional sound beams. It has been demonstrated, that this equation accurately describes the entire process of self-demodulation throughout the near field and into the far field, both on and off the axis of the beam.

$$\frac{\partial^2 p}{\partial z \partial t} = \frac{c_o}{2}\left(\frac{\partial^2}{\partial x^2} + \frac{\partial^2}{\partial y^2}\right)p + \frac{\delta}{2c_o^3}\frac{\partial^3 p}{\partial t^3} + \frac{\beta}{2\rho_o c_o^3}\frac{\partial^2 p}{\partial t^2} \quad (3)$$

Here p is pressure, $\delta$ is diffusivity of sound (absorption in the medium), $c_0$ is the signal sound velocity, $\rho_0$ is the fluid density, t is time, and x, y, z are the spatial coordinates, See, e.g., M. A. Averkiou et al. in "Self-demodulation of Amplitude-Modulated and Frequency-Modulated Pulses in a Thermoviscous Fluid," Journal of the Acoustical Society of America. 1993; 94(5): 2876-83. The first term on the right-hand side describes the effects of diffraction; the second term describes the effects of dissipation on a travelling wave; and the third term describes the nonlinear effects on the propagating sound wave and includes the nonlinearity parameter, $\beta$. In accordance with the teachings of embodiments of the present invention, the time-domain computer code developed at the University of Texas at Austin, the KZK Texas Code for the radiation from a flat, unfocused piston source (A flat finite size source that moves back and forth normal to the surface is called a piston source in acoustics.), was used to describe the difference frequency directional beam formed by the frequency mixing in the nonlinear medium. Experimental measurements of the beam formation process as a function of axial distance from the SC, where the filtered signal enters into the fluid, are compared against the predictions from Equation 3. In frequency domain, the AM signal is the same as a carrier signal with side bands, and the self-demodulation process is equivalent to frequency mixing of the side bands with the carrier to produce the difference frequency.

The magnitude of the pressure of the difference frequency wave generated is linearly proportional to the product of the pressure amplitudes of the primary waves, the effective transmitting area on the SC, the $\beta$ of the nonlinear fluid (or other material), the square of the difference frequency and inversely proportional to the $4^{th}$ power of the sound speed of the fluid, and the density and absorption of the fluid. The design of a complete device primarily involves the selection of the solid and the nonlinear fluid. It should be mentioned that it is possible to design a sonic crystal including alternating two types of solid layers, although finding a low acoustic impedance material having low sound absorption is difficult in practice. There are solids having high acoustic nonlinearity (e.g., Berea sandstone) which can be used as well in place of a liquid. These solids can also be artificially manufactured as there are not many naturally occurring solids with the desired properties.

3. Apparatus:

The sonic crystal in accordance with the teachings of embodiments of the present invention uses a solid material and a nonlinear fluid that have acoustic impedance mismatch greater than 5 to provide a transmission contrast ratio (ratio between maximum and minimum transmission) of 10 as derived from Eq. 2. To design a compact device, it is advantageous that the sound speed of the fluid be low, and the parameter $\beta$ high. It is also advantageous that the fluid have low sound absorption. Readily available microscope glass slides and Fluorinert electronic fluid FC-43 (3M, St. Paul, Minn., USA) were used for a proof of concept.

Figure 5:
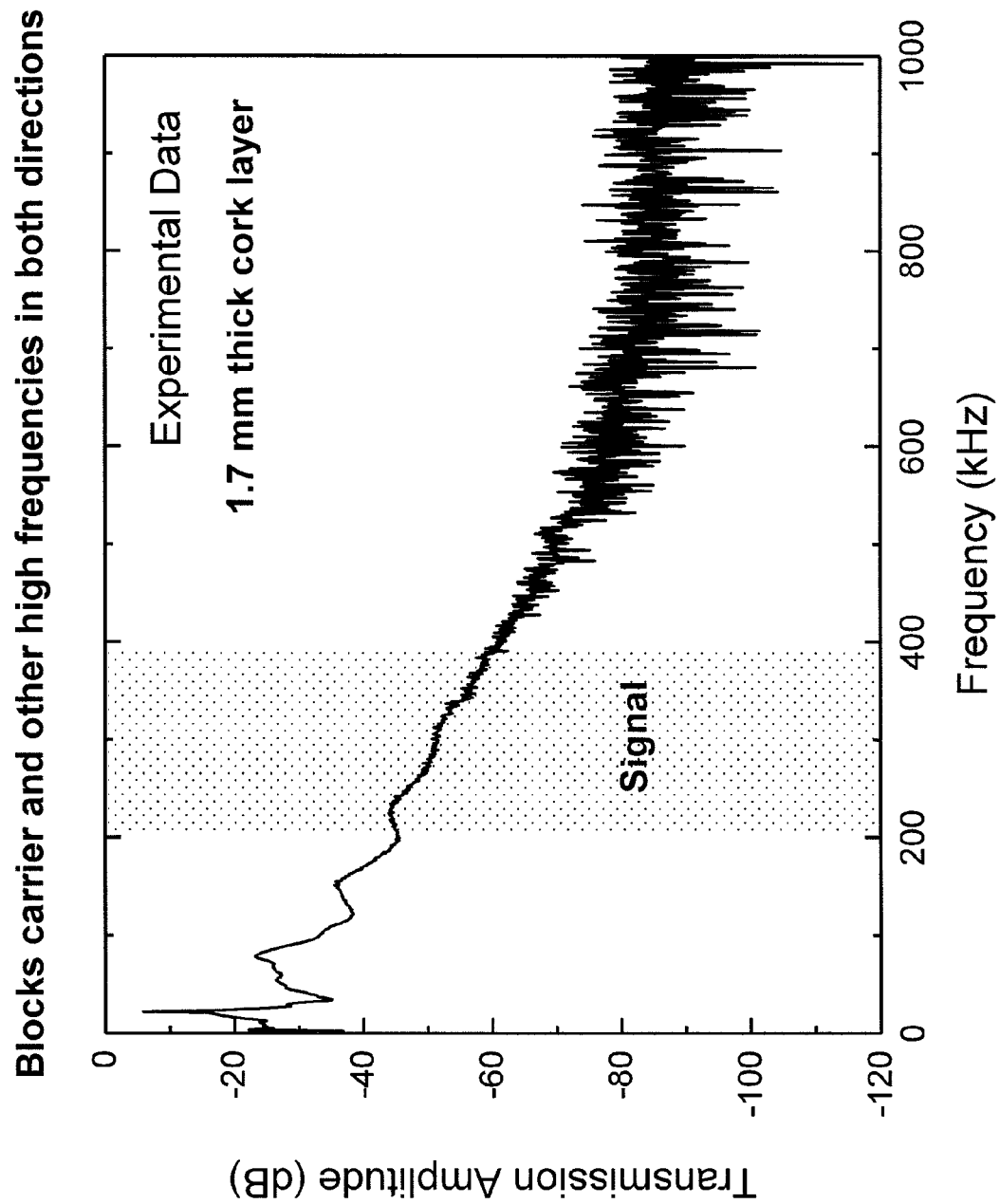
FIG. 5 shows the measured transmission characteristics of the low-pass filter constructed from a 1.7 mm layer of rubber cork, showing that at 500 kHz, the amplitude decreases by approximately 50 dB from that at 20 kHz, the shaded region illustrating the bandwidth of the transmitted signal through the apparatus.

The SC consisted of four layers of 25 mm×25 mm and 1-mm thick microscope glass slides spaced 0.7 mm apart. This spacing was created using metallic shims. The microscope glass used has a density of 2240 Kg/m$^3$, and a longitudinal sound speed of 5640 m/s. The periodic array of glass slides was then immersed in a bath of an inert liquid, FC-43, with an acoustic nonlinearity $\beta$=7.6 contained inside a Plexiglas tube (55-mm inner diameter and 82-mm long). This formed a periodic array of 7 alternate parallel layers consisting of glass and FC-43. The liquid, FC-43 has a density of 1860 Kg/m$^3$ and a very low sound speed of 646 m/s. This low sound speed is associated with small wavelength of sound which allows the construction of a very compact structure. The Plexiglas tube was sufficiently long to accommodate both the SC and FC-43. The additional liquid path-length was 65 mm and provided the nonlinear frequency mixing region. This path-length was chosen based on the KZK equation and experimentally verified to provide the optimum mixing length in the nonlinear liquid. The optimum path length was chosen as the distance where the amplitude of the difference frequency goes through a maximum. Both ends of the FC-43-filled tube were capped with two 0.7 mm thick Plexiglas discs. A 1.7 mm thick rubber cork disc was glued to one end-cap and acted as a low-pass acoustic filter to completely attenuate the high primary frequencies or the high carrier frequency. The transmission characteristics of this low pass filter are shown in FIG. 5. A piezoelectric disc transducer was attached to the glass slide on one end as the high-frequency source for the acoustic signal, and to minimize space required. The disc was a PZT-4 (Lead Zirconium Titanate) having a center frequency of 3.0 MHz, a thickness of 0.7 mm and a diameter of 20 mm, acquired from Steminc (Steiner Martin, Florida, USA), and was back-loaded with titanium filled epoxy to extend its frequency range to approximately 500 kHz. The resulting bandwidth covered the entire frequency region of interest down to very low frequency (~100 kHz), which was verified by comparing the disc transducer measurements against a commercial transducer, with both providing almost identical results.

Figure 6:
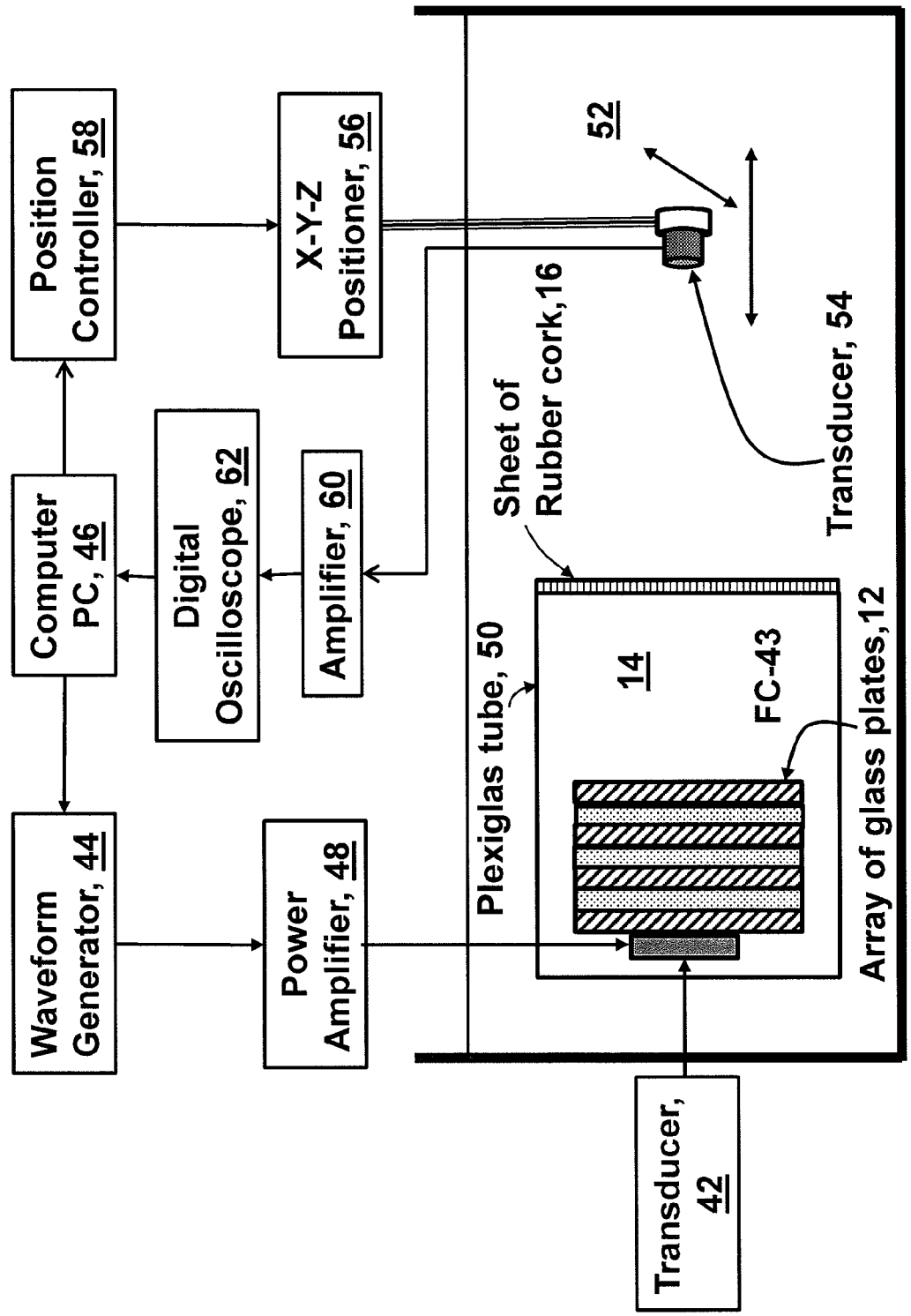
FIG. 6 is a schematic representation of the apparatus used to generate the measurements described hereinbelow.

A schematic representation of the apparatus, 40, utilized to demonstrate the teachings of embodiments of the present invention is presented in FIG. 6. Source transducer, 42, attached to one side of glass plate array 12 was driven by an arbitrary wave-function generator (Tektronix AFG 3102), 44, over a frequency range 20 kHz-10 MHz, controlled by computer, 46, through ENI 240L power amplifier, 48 with a 50 dB gain. Plexiglas tube, 50, containing periodic layer of glass plates 12 and the FC-43 fluid 14 was placed in water tank 52. Transducer 42 need not be attached to sonic crystal 12. It should be noted that sufficient intensity must be present in the signal such that nonlinear medium 14 is capable of demodulating the signal and forming a collimated beam therewith, from the initial intensity of the applied amplitude modulated signal, when coupled with losses in low-loss sonic crystal 12. A sheet of rubber cork 16 was glued to the outside surface of the end cap on the tube that serves as a low-pass acoustic filter. Piezoelectric receiver transducer, 54, was connected to 3-axis scanner, 56, and controlled by position controller, 58, and computer 46, which permitted 3-dimensional scanning of the sound beam exiting from Plexiglas tube 50. Other tubes may be used for containing the elements of this embodiment of the invention. Receiver transducer 54 was a broadband PZT-5 transducer having a diameter of 12.5 mm and a center frequency of 500 kHz. Following amplification, 60, the received signal was recorded by a Tektronix DPO 7054 oscilloscope, 62, and transferred to personal computer (PC) 46.

Figures 7A, 7B, 7C:
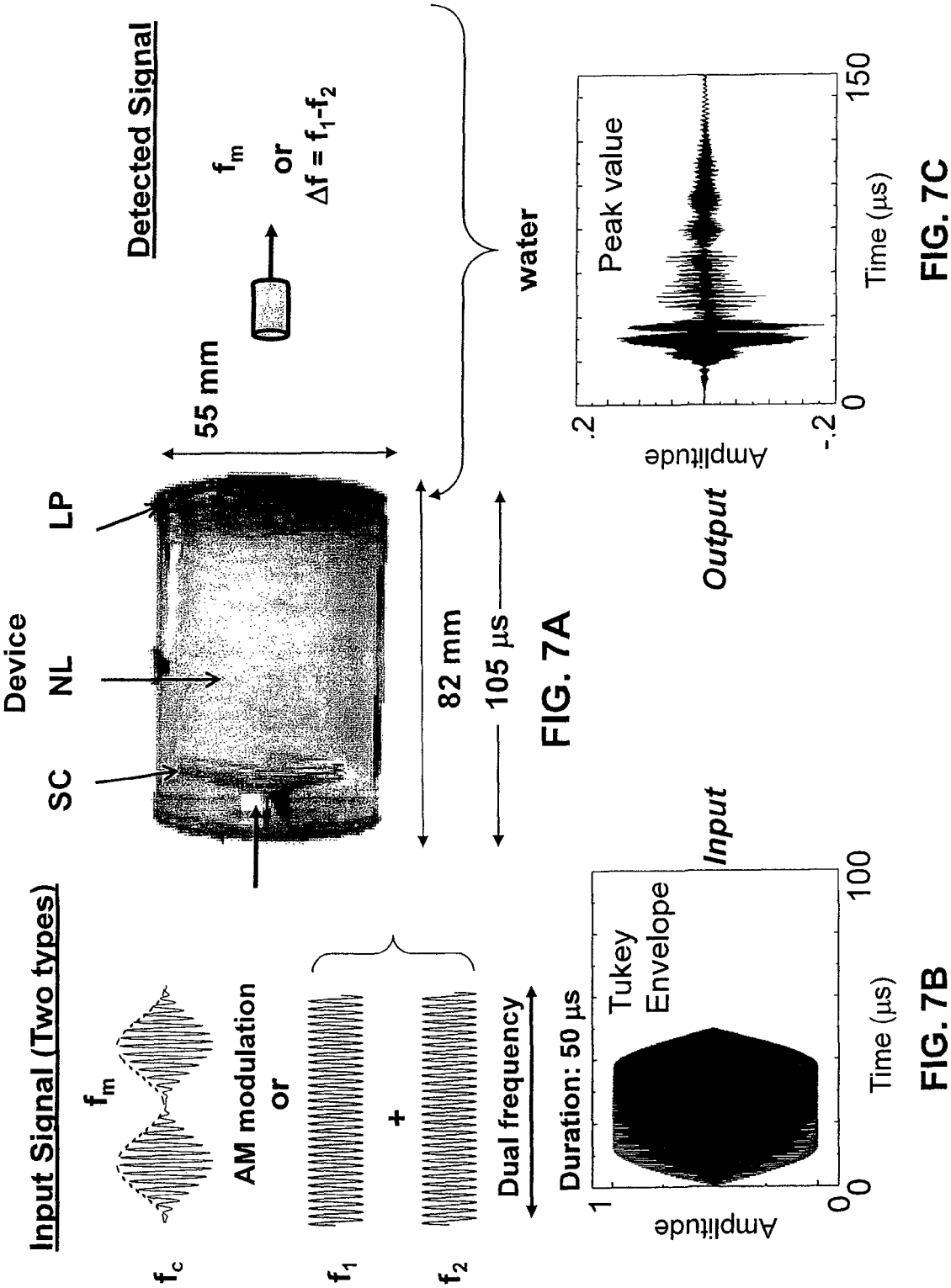
FIG. 7A illustrates two different input signal types: (1) amplitude modulation, and (2) dual frequency, where the second signal is added to the carrier frequency, wherein either signal is sent to the device on the sonic crystal (SC) end following shaping with a Tukey envelope, as shown in FIG. 7B, the apparatus being immersed in water, with a receiver transducer detecting the demodulated signal, as shown in FIG. 7C, and the peak of the received signal being recorded.

For the sound beam profile measurements, short trains of pulses were used for excitation signals, to avoid unwanted interferences and extraneous reflections in the small water tank used for the measurements. This is illustrated in FIG. 7A. The duration of the train of pulses was 50 μs. Additionally, the pulse trains were modulated with a Tukey envelope, having a parameter α=0.5, where α is a non-dimensional number with values between 0, corresponding to no modulation, and 1, corresponding to ½ cycle of sine modulation. A rectangular train of pulses generates transients at the rising and falling edges, which introduces additional nonlinearities in the system due to spurious high-frequency generation. However, a Tukey window with α≥0.5, shown in FIG. 7B, completely eliminated such transients as seen in FIG. 7C.

To determine the transmission spectrum of the SC, a network analyzer (Agilent 8753ET) that provided transmission amplitude through the SC and the SC—nonlinear fluid combination as a function of frequency from 10 kHz to 10 MHz was used. This measurement was made at a single frequency at a time. In this case, an identical transducer to the source transducer was used for the receiver, which permitted measurement of transmission in both directions to verify that the composite system behaved as an acoustic rectifier. The broadband characteristics of the transducers were measured by comparing the measurements made with commercial broadband transducers (Model V106 from Olympus NDT).

Figure 8:
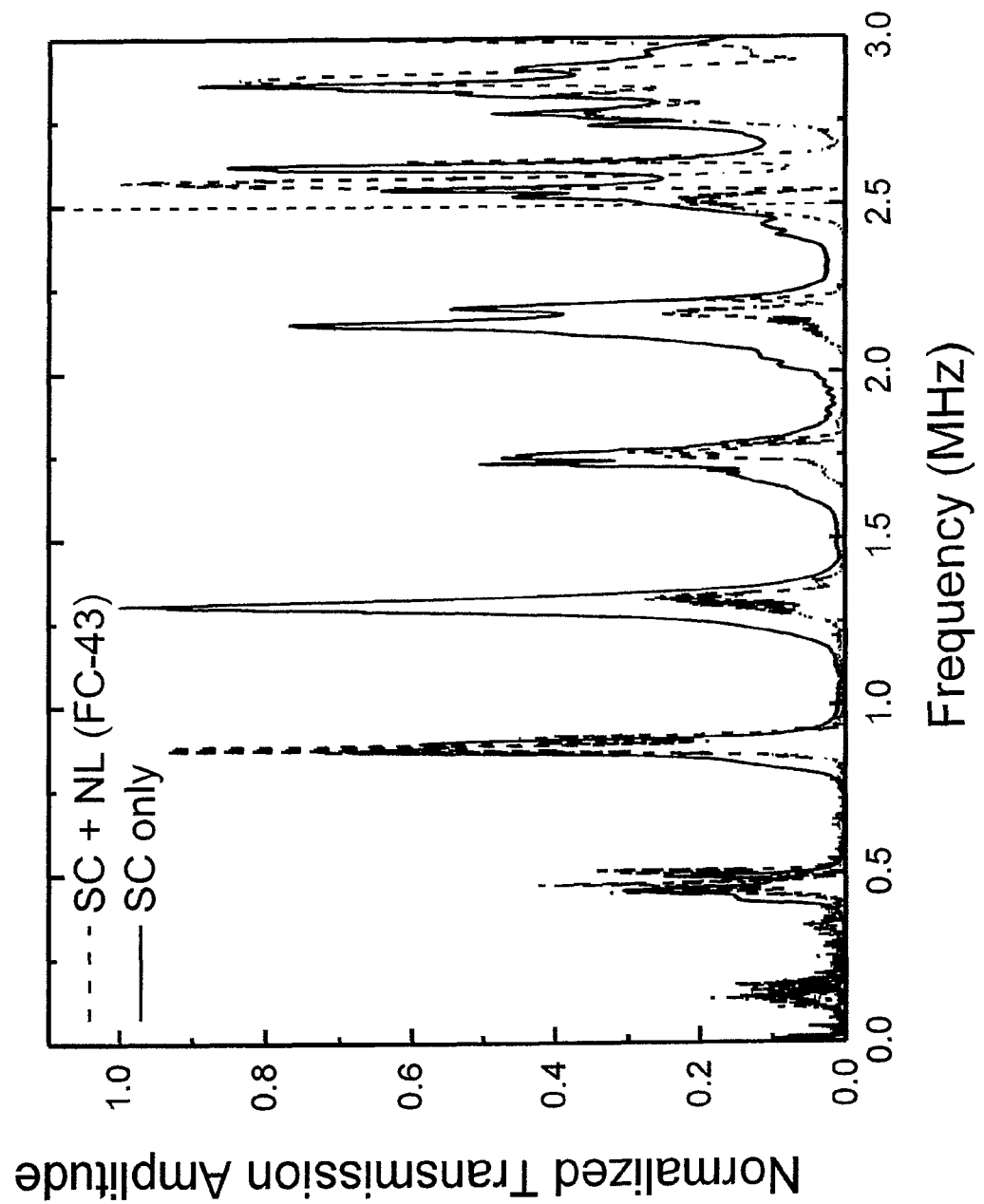
FIG. 8 illustrates the measured transmission characteristics of the glass-Fluorinert sonic crystal, where the solid line corresponds to the measurements made with the SC alone, the dashed line corresponds to the transmission of the composite system that includes both the SC and the nonlinear fluid (NL) of 65 mm path-length, both spectra being normalized for comparison purposes, where the average value of the transmitted amplitude is 30% lower for the composite case due to signal absorption in the liquid (NL).
Figure 9:
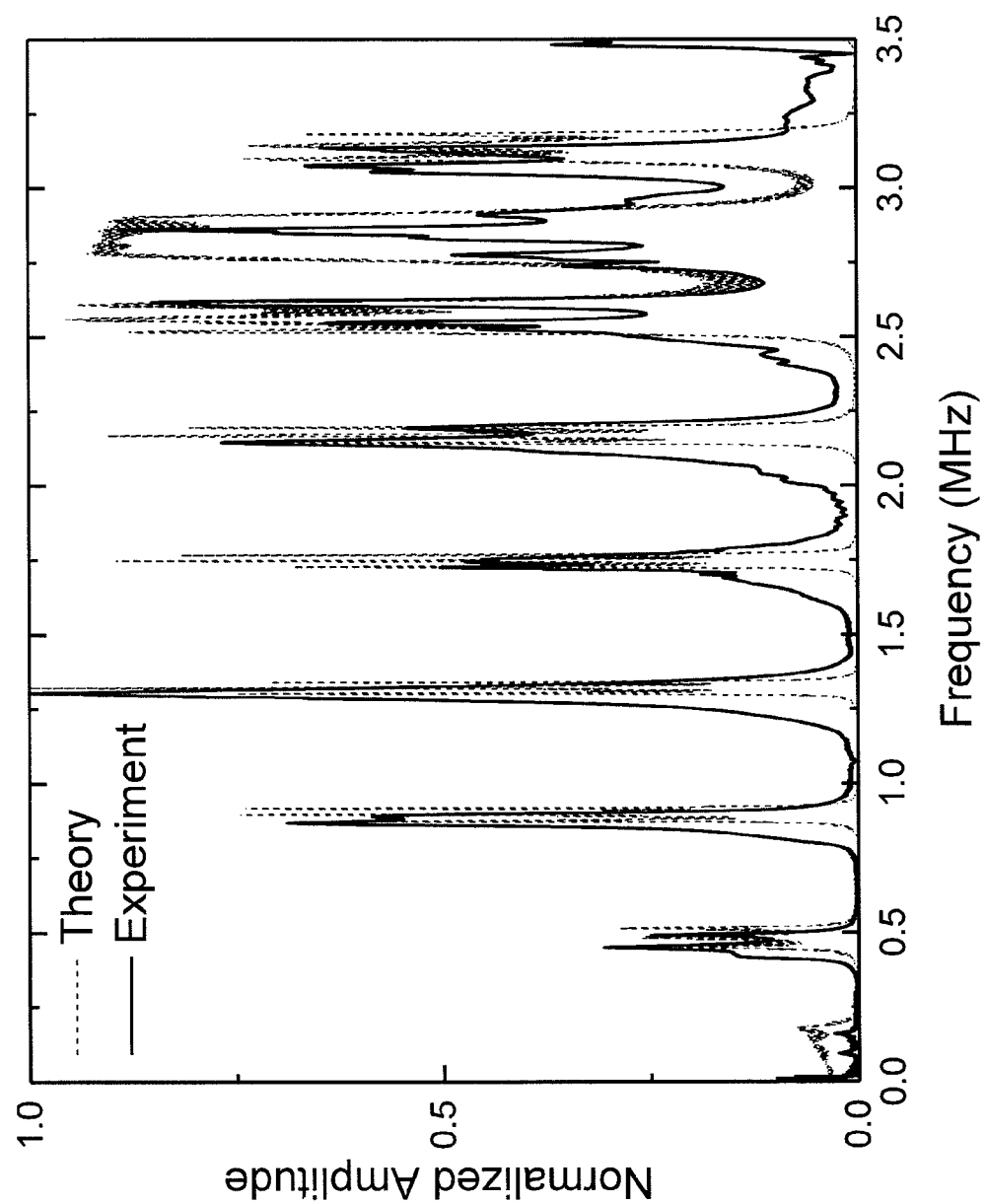
FIG. 9 shows a comparison of sound transmission as predicted from theory and what is experimentally observed.

4. Results:

The sound transmission spectrum of the sonic crystal is shown in FIG. 8. Normalized transmission characteristics for the SC alone and for the composite SC and NL liquid are shown superimposed. These two spectra match closely as seen in the theoretical prediction (FIG. 3C), although the average amplitude of the composite system is reduced by approximately 30% due to absorption in the liquid. The transmission bands due to the liquid layer and the solid glass layer can be seen in both theoretical predictions (FIG. 3), and in experimental measurements. The glass layer contributes to the broad pass band between 2.7 MHz and 3.25 MHz, and the carrier frequency was chosen to be close to this center frequency, since the width of this pass band defines the bandwidth of the sound that can be used. It should be mentioned that the imperfect nature of the pass band shown in FIG. 8 is due to the low number of layers in the SC used. Simulations show that all pass-bands (both for liquid layer and the solid layer) become flatter with minimum fluctuations as the number of layers increase (FIG. 3). Small variations (<1%) in the layer thickness (e.g., the liquid layer) can also contribute to the fluctuations in the pass band. FIG. 9 shows that a minor adjustment of the thickness of the glass from 1 mm to 0.998 mm in the theoretical prediction provides an excellent match between theory and experimental data. The number of narrower pass bands corresponding to the liquid layer may be lowered by using thinner liquid layers. Uncertainty in the sound speed and density values for the microscope slide also contributed to the observed difference between the predicted transmission spectrum and the experimentally measured one, as these values were obtained from the literature and not measured. The first band gap between 200 kHz to 420 kHz is the frequency region of interest where the sound beam generation is explored. This region is between the lowest pass band and the first narrow liquid band. Thinner liquid layer would produce fewer narrow pass bands since these would be spaced much wider in frequency. Because of the closer acoustic impedances between glass and FC-43, there is large transmission of sound through all pass bands. Such higher transmission allows sufficient energy into the nonlinear fluid region for amplitude demodulation (difference frequency generation) and beam formation. As mentioned hereinabove, the SC structure and the FC-43 liquid were both contained inside a single Plexiglas tube having windows.

Figure 10:
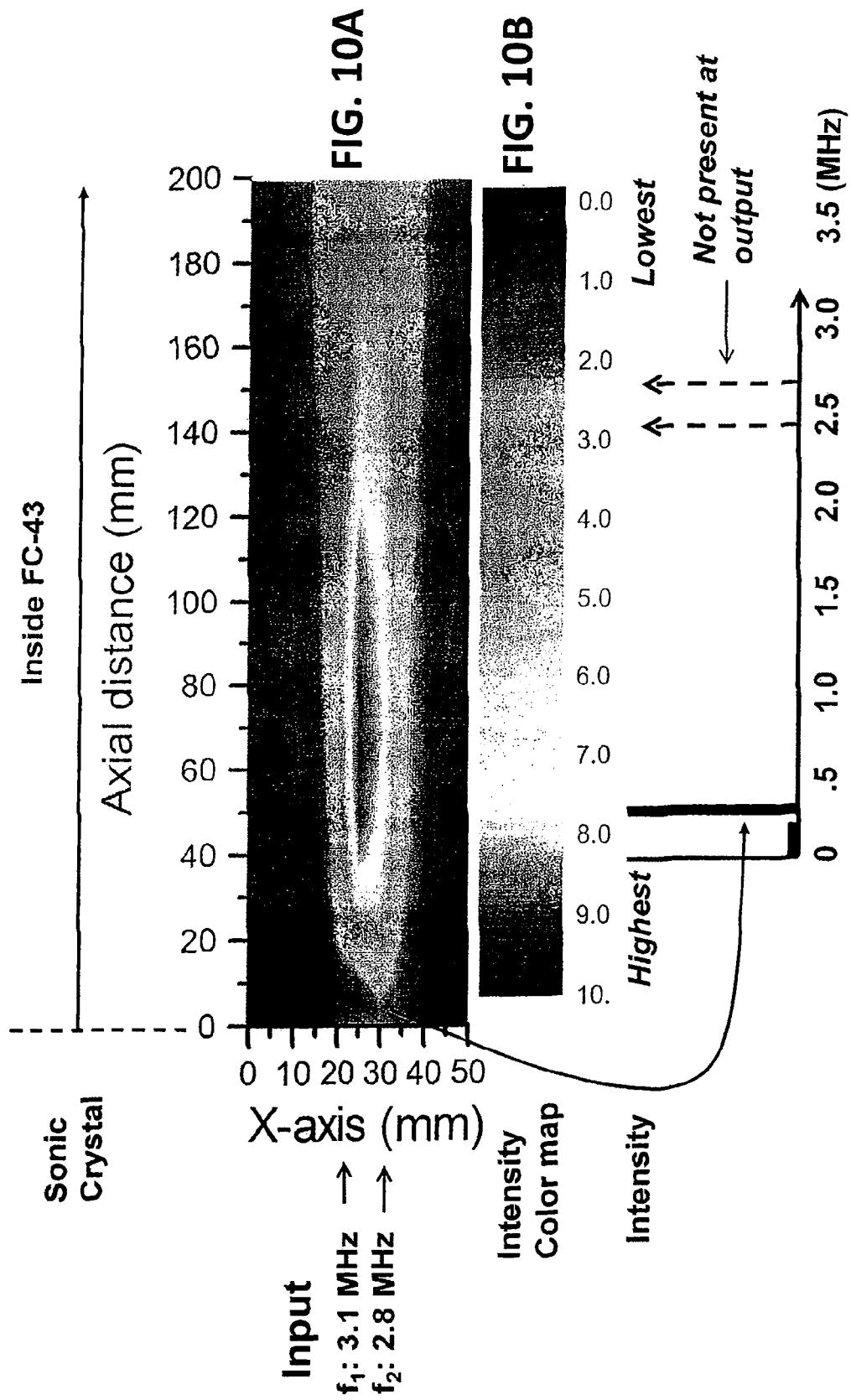
FIG. 10A illustrates the difference frequency beam at 300 kHz in Fluorinert, where the intensity scale is shown on the bottom right horizontal panel, in FIG. 10B, the measurements being taken in a bath of FC-43 using a calibrated hydrophone, with the spectrum of the input and output frequencies being shown below the beam profile, in FIG. 10C, where only the difference frequency is present at the output and the original input frequencies are gone.
Figure 11:
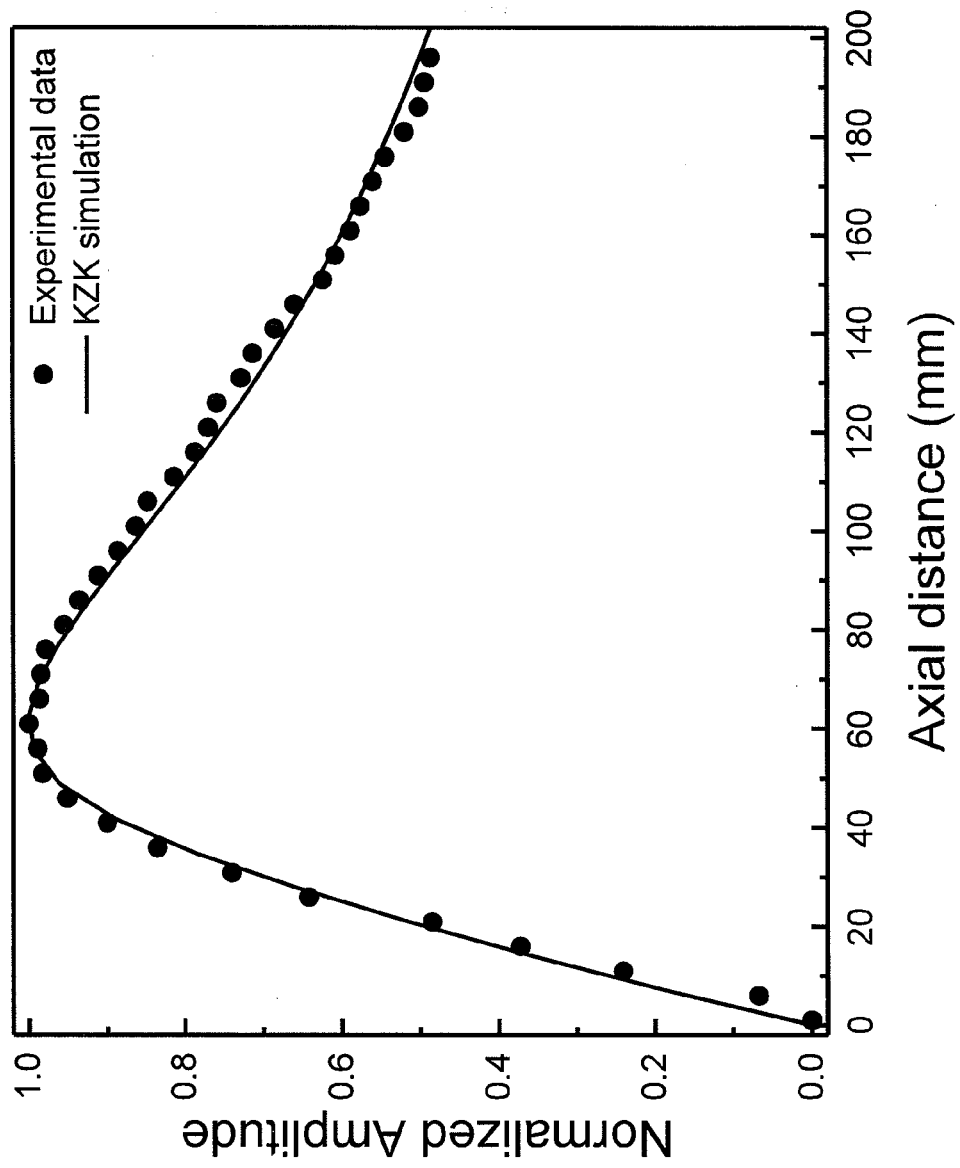
FIG. 11 illustrates the axial intensity profile of the beam shown in FIG. 10 hereof, with the solid circles representing the experimental data and the solid line is theoretical prediction derived from the KZK equation with the parameters used for the theoretical prediction including the following: primary frequencies of 2.85 and 3.1 MHz with a median frequency of 2.95 MHz; median pressure of the primaries: 55 kPa; source diameter (SC outside surface opposite the transducer): 20 mm; FC-43 $\beta$: 7.6; FC-43 density: 1850 kg/m$^3$; FC-43 sound speed: 646 m/s; absorption parameter: 6.17; nonlinear parameter (ratio of Rayleigh length and Shock length): 22.29.

The 2D beam profile generated from the SC structure was obtained by scanning the beam with a calibrated hydrophone (ONDA Corporation, HNR-1000: SN1455) in a bath of FC-43 and is shown in FIG. 10A, whereas the beam intensity profile along the propagation axis is shown in FIG. 11. The mixing frequencies used were $f_1$=2.8 MHz, and $f_2$=3.1 MHz, resulting in a difference frequency of Δf=300 kHz. Two principal observations can be made from these two figures. First, the difference frequency of 300 kHz propagates as a narrow beam as expected. Second, the difference frequency intensity goes through a maximum (solid circles in FIG. 11), located approximately 65 mm from the SC, in excellent agreement with the predictions from the KZK-equation (solid line). This is the optimum path-length that was used for the mixing length (NL in FIG. 2) of the FC-43 in the Plexiglas container. The spectrum at the bottom of FIG. 10C shows how the original two high frequencies are not present in the beam that is generated due to frequency mixing. When the thin layer of rubber cork (LP in FIG. 2) was included following the liquid, frequencies above 500 kHz were reduced by more than 50 dB. Thus, this allowed only the difference frequencies to pass through and assured that none of the high-frequency primaries or any higher harmonics remained. It is possible to further define the shape of the beam by making the filter surface appropriately curved to induce a focusing effect.

Figure 12:
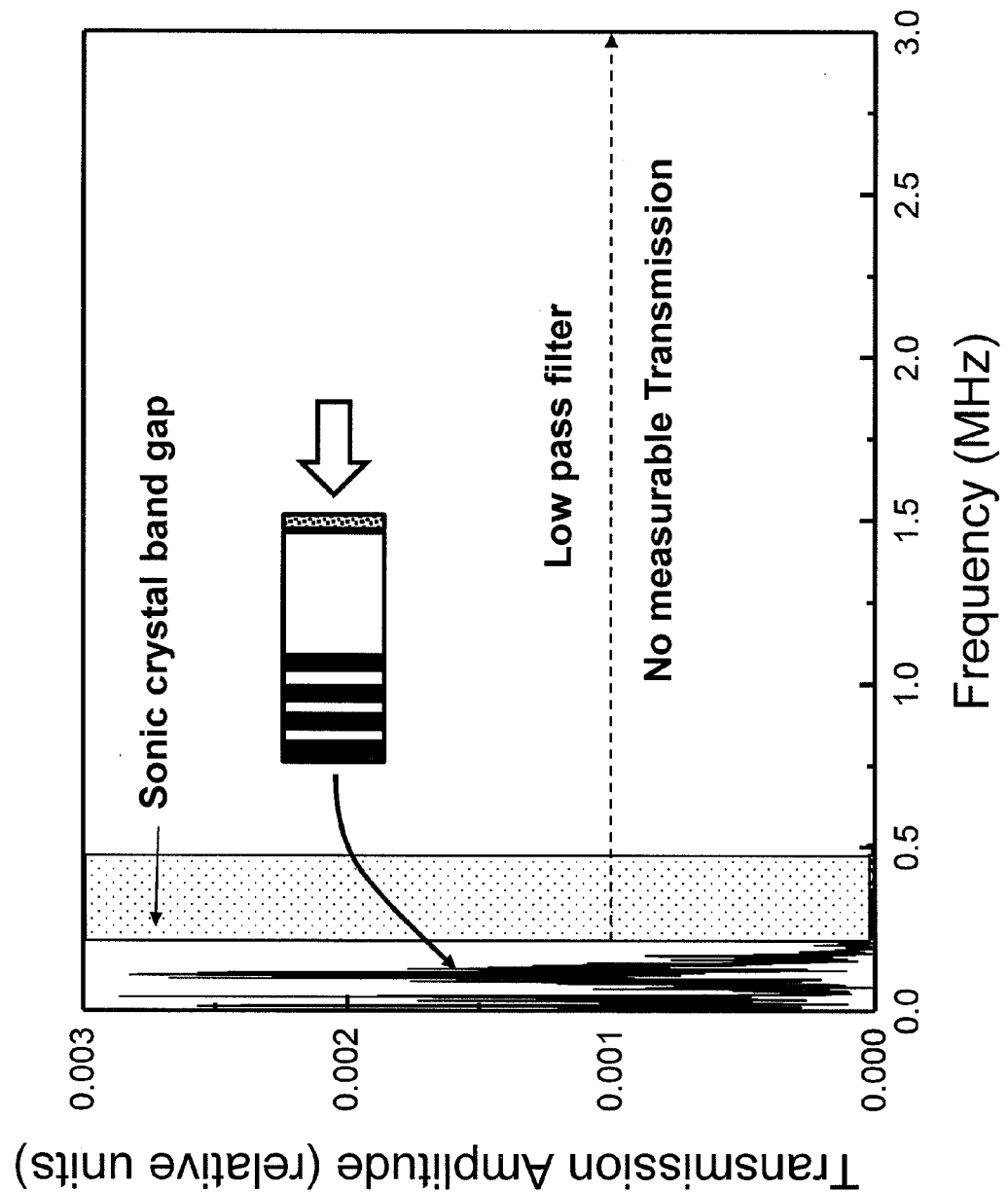
FIG. 12 shows the reverse transmission characteristics of the sonic crystal (SC)-Fluorinert (NL)-rubber cork layer (LP) combination showing little overall transmission (three orders of magnitude) as compared to FIG. 8 hereof, wherein the excitation was from the LP side (right side of FIG. 1 hereof), and the receiver was on the left side of the SC, the rubber cork filter cutting off propagation above 450 kHz; the shaded region shows the sonic crystal transmission bandgap.

The reverse transmission characteristic of the SC-NL-LP apparatus is shown in FIG. 12 as obtained using the network analyzer with the source being on the LP side. As can be seen from this FIGURE, there is essentially no observable transmission above 220 kHz. The first band gap of SC falls between 200-400 kHz. The structure behaves in a practically unidirectional manner, because any sound of frequency higher than ~500 kHz (LP cut-off frequency) entering from the LP side (See FIG. 2) is blocked by the filter. Further, SC band-gap prevents sound transmission down to 200 kHz. The remaining lowest frequency signal observed is three orders of magnitude smaller than what is observed in the forward direction. It is to be mentioned that when high frequency sound enters from the SC side, the demodulated or difference frequency is generated internally in the nonlinear medium. This frequency cannot travel backwards because of the first band-gap of SC and can only travel in the forward direction. The thin layers of the FC-43 in the intervening position in the SC, can also resonantly amplify the difference frequency signal if the thickness of the layer is properly chosen (integral number of half wavelengths of the difference frequency).

The beam profile was determined by immersing the device in a water bath as shown in FIG. 6. The measured intensity profile along the axis of the beam is presented in FIG. 13A for a difference frequency of $\Delta f=300$ kHz. The primaries were chosen to be $f_1=2.8$ MHz and $f_2=3.1$ MHz. It can be seen that the low-frequency beam, after passing through LP, preserves the narrow beam characteristics of the beam in FC-43 as shown in FIG. 10. Because of the granular nature of the material (cork) used for LP, the beam is slightly more jagged in nature, however. Difference frequencies ranging from 220 kHz to 370 kHz were tested and these produced very similar profiles to those in FIG. 13A. Additionally, the AM demodulation and directional beam formation were also tested. A 2.95 MHz carrier wave was modulated with a low-frequency signal of 220 kHz and applied to the source transducer. The resulting directional beam is shown in FIG. 13B. This beam is not as well defined since the experimentally observed band pass region was not flat and had dips in amplitude. This was caused by a slight imperfection in the alignment of the glass layers. Nevertheless, these results clearly demonstrate the primary objective of embodiments of the present invention that unidirectional and broadband directional sound beam can be produced using a combination of sonic crystal, nonlinear material and a low-pass filter. It should be mentioned that the liquid used in the sonic crystal and for the nonlinear medium need not be the same. The pass band and the band gap characteristics of the sonic crystal may be designed for a particular application.

Although the measurements presented used a nonlinear fluid for frequency mixing, AM demodulation, and beam formation, it is anticipated that solids may be used for this purpose. The pair of solids needs to be of materials that have different acoustic impedance. Higher acoustic impedance mismatch or larger number of layers will produce better bandgap contrast. Such solids having acoustic nonlinearity include granular materials, composite materials, and polymers among others. See, e.g., V. Tournat et al. in "Experimental study of nonlinear acoustic effects in a granular medium," Acoustical Physics 2005; 51(5):543-53; S. Biwa et al. in "Evaluation of Nonlinear Low-Frequency Components Generated by Amplitude-Modulated Waves in a Carbon/Carbon Composite," B B J Linde et al., editors, International Congress on Ultrasonics 2012, p. 497-500; and M. C. Wu et al. in "Nonlinearity Parameters of Polymers," IEEE 1989 Ultrasonics Symposium: Proceedings, Vols. 1 and 2, 1989: 1241-4.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for generating a collimated, unidirectional acoustic signal having a frequency $f_m$ or a band of frequencies centered at $f_m$, from an input carrier signal having a frequency $f_c > f_m$ amplitude modulated by $f_m$, comprising:
   a low-loss acoustic bandpass filter for receiving the modulated carrier signal, and having a bandwidth larger than an amplitude modulated sideband of the amplitude modulated $f_c$;
   an acoustic nonlinear medium for receiving and demodulating the amplitude modulated $f_c$ from said acoustic bandpass filter, whereby a collimated acoustic signal having a frequency $f_m$ is generated; and
   a low-pass acoustic filter for preventing the carrier signal or the amplitude modulated carrier signal from being transmitted through said apparatus in the direction opposite to the generated collimated acoustic signal.

2. The apparatus of claim 1, wherein said input carrier signal $f_c$ amplitude modulated by $f_m$ is generated by an acoustic transducer.

3. The apparatus of claim 1, wherein said acoustic bandpass filter comprises a phononic crystal.

4. The apparatus of claim 1, wherein said acoustic bandpass filter comprises a sonic crystal.

5. The apparatus of claim 1, wherein the amplitude modulation of said input carrier signal $f_c$ amplitude modulated by $f_m$ is chosen from carrier suppressed double sideband modulation, single sideband modulation, and double sideband modulation.

6. The apparatus of claim 1, wherein said acoustic nonlinear medium comprises a nonlinear acoustic liquid.

7. A method for generating a collimated, unidirectional acoustic signal having a frequency $f_m$ or a band of frequencies centered at $f_m$, from an input carrier signal having a frequency $f_c > f_m$ amplitude modulated by $f_m$, comprising:
   passing the modulated carrier signal through a low-loss acoustic bandpass filter having a bandwidth larger than an amplitude modulated sideband of the amplitude modulated $f_c$;
   demodulating the bandpass filtered amplitude modulated $f_c$ from said acoustic bandpass filter, whereby a collimated acoustic signal having a frequency $f_m$ is generated; and
   passing the collimated acoustic signal having a frequency $f_m$ through a low pass filter, whereby the carrier signal or the amplitude modulated carrier signal are prevented from being transmitted through the bandpass filter in the direction opposite to the generated collimated acoustic signal.

8. The method of claim 7, wherein said step of demodulating the bandpass filtered amplitude modulated $f_c$ is performed by a nonlinear acoustic medium.

9. The method of claim 8, wherein the nonlinear acoustic medium comprises a nonlinear acoustic liquid.

10. The method of claim 7, wherein the input carrier signal $f_c$ amplitude modulated by $f_m$ is generated by an acoustic transducer.

11. The method of claim 7, wherein the acoustic bandpass filter comprises a phononic crystal.

12. The method of claim 7, wherein the acoustic bandpass filter comprises a sonic crystal.

13. The method of claim 7, wherein the amplitude modulation of the input carrier signal $f_c$ amplitude modulated by $f_m$ is chosen from carrier suppressed double sideband modulation, single sideband modulation, and double sideband modulation.

* * * * *